(12) United States Patent
Mark

(10) Patent No.: US 8,497,007 B2
(45) Date of Patent: Jul. 30, 2013

(54) PROTECTIVE SHEATHING APPARATUS

(76) Inventor: James Edward Mark, Philadelphia, PA (US)

( * ) Notice: Subject to any disclaimer, the term of this patent is extended or adjusted under 35 U.S.C. 154(b) by 245 days.

(21) Appl. No.: 13/038,547

(22) Filed: Mar. 2, 2011

(65) Prior Publication Data
US 2011/0217490 A1     Sep. 8, 2011

Related U.S. Application Data

(66) Substitute for application No. 61/309,878, filed on Mar. 3, 2010.

(51) Int. Cl.
*H02G 3/04* (2006.01)
*B32B 3/06* (2006.01)

(52) U.S. Cl.
USPC ............. 428/100; 428/99; 174/72 A; 174/135

(58) Field of Classification Search
USPC ........................... 428/99, 100; 174/135, 72 A
See application file for complete search history.

(56) References Cited

U.S. PATENT DOCUMENTS

| 5,600,098 | A | 2/1997 | Kazaks |
| 6,523,584 | B1 * | 2/2003 | Rehrig .......................... 150/154 |
| 7,119,279 | B2 | 10/2006 | Niehaus et al. |
| 7,438,964 | B2 | 10/2008 | Clark |
| 2002/0098311 | A1 | 7/2002 | Lindner |
| 2004/0099426 | A1 * | 5/2004 | Bryl et al. .................... 174/35 C |
| 2009/0255702 | A1 | 10/2009 | Mitchell |

* cited by examiner

*Primary Examiner* — Alexander Thomas
(74) *Attorney, Agent, or Firm* — Ash Tankha; Lipton, Weinberger & Husick

(57) ABSTRACT

A protective sheathing apparatus comprising an elongated flexible member, first fastening elements, second fastening elements, an attachment section, and one or more third fastening elements is provided. The first fastening elements and the second fastening elements are affixed in proximity to a first lengthwise edge and a second lengthwise edge of the elongated flexible member respectively. The affixed second fastening elements detachably engage with the affixed first fastening elements for defining a generally cylindrical lengthwise channel within the elongated flexible member for accommodating one or more longitudinal objects. The attachment section is attached to and extends outwardly from a first widthwise edge and/or a second widthwise edge of the elongated flexible member for enabling detachable engagement with another protective sheathing apparatus. The third fastening elements are affixed on an exterior surface of the elongated flexible member for enabling detachable attachment of the protective sheathing apparatus to a support surface.

13 Claims, 13 Drawing Sheets

PROTECTIVE SHEATHING APPARATUS

CROSS REFERENCE TO RELATED APPLICATIONS

This application claims the benefit of provisional patent application No. 61/309,878 titled "Protective Sheathing Apparatus", filed on Mar. 3, 2010 in the United States Patent and Trademark Office.

The specification of the above referenced application is incorporated herein by reference in its entirety.

BACKGROUND

Conventional cable covers available commercially comprise a single piece of material for covering cables, for example, hardware equipment cables, computer cables, printer cables, fax cables, etc., enclosed within the cable covers. While these cable covers cover and shield cables, these cable covers do not efficiently prevent tangling of a large number of cables of different lengths and do not allow flexibility of use, maintenance, and organization of the cables in a work area.

Moreover, conventional cable covers are configured to accommodate particular types of wires, cables, etc. These cable covers become unusable, for example, when wiring configurations in a work area change, thereby necessitating the use of new cable covers for the changed environment. When such cable covers are used for a prolonged period of time, they develop a tendency to attract static electricity charges from the cables or wires resulting in hazardous situations. Moreover, these cable covers do not provide a facility for inserting or removing cables at any location as per the needs of a user. Furthermore, when long cables are used, the conventional cable covers cannot accommodate and therefore cannot be used to cover cables over long distances.

Furthermore, cable covers are typically confined to ground surfaces or table surfaces on which they are disposed, without any facility for suspending, hanging, or providing easier access to the enclosed cables during cleaning or maintenance. These cable covers disallow management of the enclosed cables in a work area having multiple contours as they do not have a provision for shaping the cable covers into a shapeable turn around contoured edges of the work area, which leads to wear and tear of the cable covers and constriction of the enclosed cables enclosed in the cable covers which affects the workability of the enclosed cables.

Hence, there is a long felt but unresolved need for a protective sheathing apparatus that covers multiple objects, for example, cables, of different lengths and prevents dust build up over the enclosed objects. Moreover, there is a need for a protective sheathing apparatus that provides easier accessibility of the enclosed objects of different lengths and allows efficient management and organization of the enclosed objects in any area. Furthermore, there is a need for a protective sheathing apparatus that can be attached to any support surface, for example, a wall, a board, a table surface, etc., during cleaning and maintenance, and that allows the protective sheathing apparatus to be maneuvered along contours of one or more support surfaces.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The protective sheathing apparatus disclosed herein addresses the above stated needs for covering multiple objects of different lengths and preventing dust build up over the enclosed objects. The protective sheathing apparatus disclosed herein provides easier accessibility of the enclosed objects of different lengths and allows efficient management and organization of the enclosed objects in any area. The protective sheathing apparatus disclosed herein can be attached to any support surface, for example, a wall, a board, a table surface, etc., during cleaning and maintenance. The protective sheathing apparatus disclosed herein can be maneuvered along contours of one or more support surfaces.

The protective sheathing apparatus disclosed herein comprises a generally rectangular elongated flexible member, multiple first fastening elements, multiple second fastening elements, an attachment section, and one or more third fastening elements. The elongated flexible member comprises a first lengthwise edge, a second lengthwise edge, a first widthwise edge, and a second widthwise edge. The first fastening elements are affixed in proximity to the first lengthwise edge of the elongated flexible member. The second fastening elements are affixed in proximity to the second lengthwise edge of the elongated flexible member. The first fastening elements and the second fastening elements are, for example, mating snap fasteners.

The second fastening elements are configured to detachably engage with the first fastening elements when the second lengthwise edge of the elongated flexible member is rolled over towards the first lengthwise edge of the elongated flexible member. When the second lengthwise edge of the elongated flexible member is rolled over towards the first lengthwise edge of the elongated flexible member and fastened using the second fastening elements and the first fastening elements, the generally rectangular elongated flexible member takes a form of a generally cylindrical elongated flexible member. The detachable engagement of the second fastening elements with the first fastening elements defines a generally cylindrical lengthwise channel within the elongated flexible member for accommodating one or more longitudinal objects, for example, wires, cables, cords, etc. The elongated flexible member encloses the longitudinal objects within the generally cylindrical lengthwise channel.

The attachment section of the protective sheathing apparatus is attached to and extends outwardly from the first widthwise edge and/or the second widthwise edge of the elongated flexible member for enabling detachable engagement with another protective sheathing apparatus. The protective sheathing apparatus disclosed herein further comprises one or more fourth fastening elements affixed on the attachment section and in proximity to the first widthwise edge and/or the second widthwise edge of the elongated flexible member of another protective sheathing apparatus for detachably engaging the protective sheathing apparatus to another protective sheathing apparatus.

The third fastening elements are affixed on an exterior surface of the elongated flexible member for enabling detachable attachment of the protective sheathing apparatus enclosing the longitudinal objects to a support surface, for example, a wall. The third fastening elements are, for example, hook and loop fasteners. Hook sides or loop sides of the hook and loop fasteners are affixed on the exterior surface of the elongated flexible member. An opposing one of the hook sides and the loop sides of the hook and loop fasteners are attached to the support surface for allowing detachable attachment of the protective sheathing apparatus to the support surface. In an embodiment, the protective sheathing apparatus disclosed herein further comprises one or more patterns and textual information displayed on the exterior surface of the elongated flexible member for decorative and/or instructional purposes.

In an embodiment, the protective sheathing apparatus disclosed herein further comprises a support sleeve attached along the exterior surface of the elongated flexible member. The support sleeve defines a pocket along the elongated flexible member for incorporating a shaping rod within the defined pocket. The shaping rod enables the protective sheathing apparatus to be maneuvered along contours of one or more support surfaces.

In an embodiment, the protective sheathing apparatus disclosed herein further comprises one or more slots defined on the elongated flexible member for allowing one or more of the longitudinal objects to be inserted into and exited out from the generally cylindrical lengthwise channel defined within the elongated flexible member.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific components and methods disclosed herein.

DETAILED DESCRIPTION OF THE INVENTION

Figure 1A:
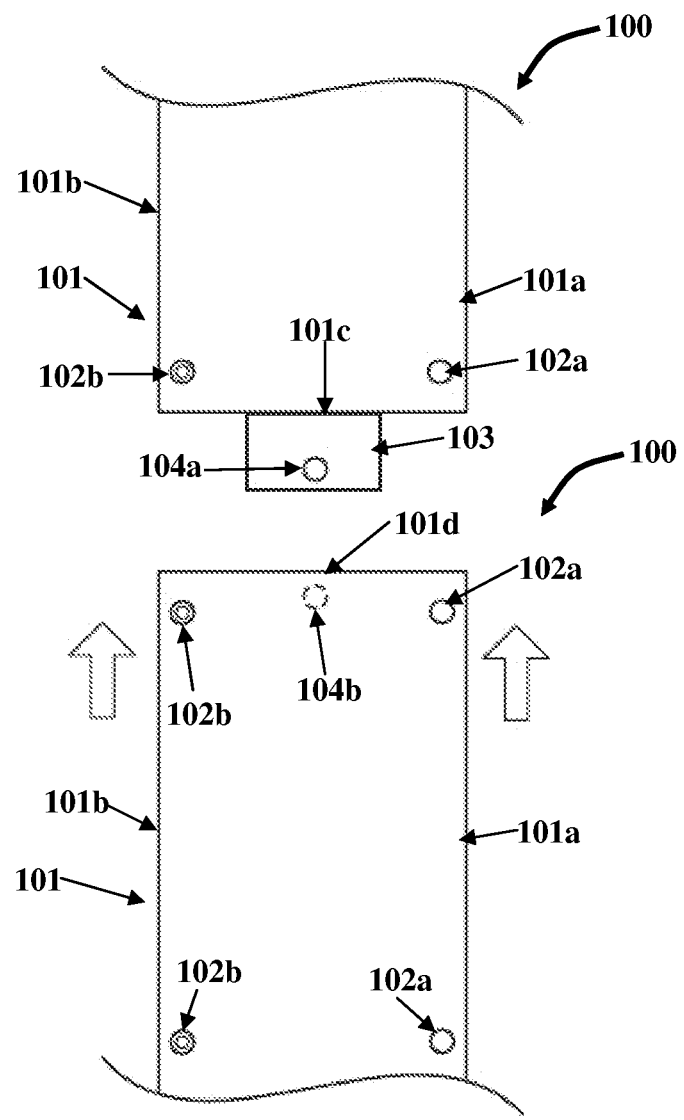
FIG. 1A exemplarily illustrates a front orthogonal view of a protective sheathing apparatus detachably engageable with another protective sheathing apparatus.

FIG. 1A exemplarily illustrates a front orthogonal view of a protective sheathing apparatus 100 detachably engageable with another protective sheathing apparatus 100. The protective sheathing apparatus 100 disclosed herein comprises an elongated flexible member 101, multiple first fastening elements 102a, and multiple second fastening elements 102b. The elongated flexible member 101 is made of a light and flexible material, for example, fabric, plastic, rubber, etc., or any combination thereof. The elongated flexible member 101 can therefore be bent to any arbitrary shape to be attachable to a support surface 401, 602, etc., as exemplarily illustrated in FIG. 4 and FIGS. 6A-6C. The elongated flexible member 101 is generally rectangular is shape and comprises a first lengthwise edge 101a, a second lengthwise edge 101b, a first widthwise edge 101c, and a second widthwise edge 101d. The first fastening elements 102a are affixed in proximity to the first lengthwise edge 101a of the elongated flexible member 101. The second fastening elements 102b are affixed in proximity to the second lengthwise edge 101b of the elongated flexible member 101. The first fastening elements 102a and the second fastening elements 102b are affixed in proximity to the first lengthwise edge 101a and the second lengthwise edge 101b of the elongated flexible member 101 respectively, for example, by sewing, plying, etc.

In an embodiment, the first fastening elements 102a and the second fastening elements 102b are opposingly affixed at different distances in proximity to the first lengthwise edge 101a and the second lengthwise edge 101b of the elongated flexible member 101 respectively. In another embodiment, the first fastening elements 102a and the second fastening elements 102b are affixed in proximity to the first lengthwise edge 101a and the second lengthwise edge 101b of the elongated flexible member 101 respectively on opposing surfaces 101e and 101f of the elongated flexible member 101 as exemplarily illustrated in FIG. 1B. In another embodiment, the second fastening elements 102b and the first fastening elements 102a are affixed in proximity to the second lengthwise edge 101b and the first lengthwise edge 101a of the elongated flexible member 101 respectively on a same surface 101e or 101f of the elongated flexible member 101.

The second fastening elements 102b are configured to detachably engage with the first fastening elements 102a when the second lengthwise edge 101b of the elongated flexible member 101 is rolled over towards the first lengthwise edge 101a of the elongated flexible member 101. The first fastening elements 102a and the second fastening elements 102b are, for example, mating snap fasteners. The detachable engagement of the second fastening elements 102b with the first fastening elements 102a defines a generally cylindrical lengthwise channel 105 within the elongated flexible member 101 as exemplarily illustrated in FIGS. 1B-1C. The generally cylindrical lengthwise channel 105 accommodates one or more longitudinal objects 201, for example, wires, cables, cords, hoses, etc., as exemplarily illustrated in FIGS. 2A-2B and FIGS. 6A-6C.

The protective sheathing apparatus 100 further comprises an attachment section 103 attached to and extending outwardly from the first widthwise edge 101c and/or the second widthwise edge 101d of the elongated flexible member 101 for enabling detachable engagement with another protective sheathing apparatus 100. In an embodiment, the attachment section 103 is provided as a part of the first widthwise edge 101c and/or the second widthwise edge 101d of the elongated flexible member 101 and is configured to detachably engage with the first widthwise edge 101c or the second widthwise edge 101d of the elongated flexible member 101 of another protective sheathing apparatus 100, for example, using interlocking fastening elements 104a and 104b. The interlocking fastening elements 104a and 104b are, for example, mating snap fasteners.

In another embodiment, the attachment section 103 is provided as an extension to the first widthwise edge 101c and/or the second widthwise edge 101d of the elongated flexible member 101 and is configured to detachably engage with the first widthwise edge 101c or the second widthwise edge 101d of the elongated flexible member 101 of another protective sheathing apparatus 100 using interlocking fastening elements 104a and 104b. As exemplarily illustrated in FIGS. 1A-1C, the attachment section 103 is rigidly attached to the first widthwise edge 101c of the elongated flexible member 101 of one protective sheathing apparatus 100 and configured to detachably engage with the second widthwise edge 101d of the elongated flexible member 101 of another protective sheathing apparatus 100 using interlocking fastening elements 104a and 104b. In another embodiment, the attachment section 103 is provided as an external attachment section that can be detachably attached to the first widthwise edge 101c and/or the second widthwise edge 101d of the elongated flexible member 101 of one protective sheathing apparatus 100 and configured to detachably engage with the first widthwise edge 101c or the second widthwise edge 101d of the elongated flexible member 101 of another protective sheathing apparatus 100 using interlocking fastening elements 104a and 104b.

The attachment section 103 serves as an interconnecting mechanism to interconnect the protective sheathing apparatus 100 to another protective sheathing apparatus 100, to increase the length of the protective sheathing apparatus 100 and enclose longitudinal objects 201 of long lengths in locations such as factories, computer server rooms, etc., that require management of longitudinal objects 201 with long lengths. Therefore, multiple protective sheathing apparatuses 100 can be connected to each other using the attachment section 103 for increasing the length of the protective sheathing apparatus 100 in order to accommodate and organize lengthy longitudinal objects 201.

Figure 1B:
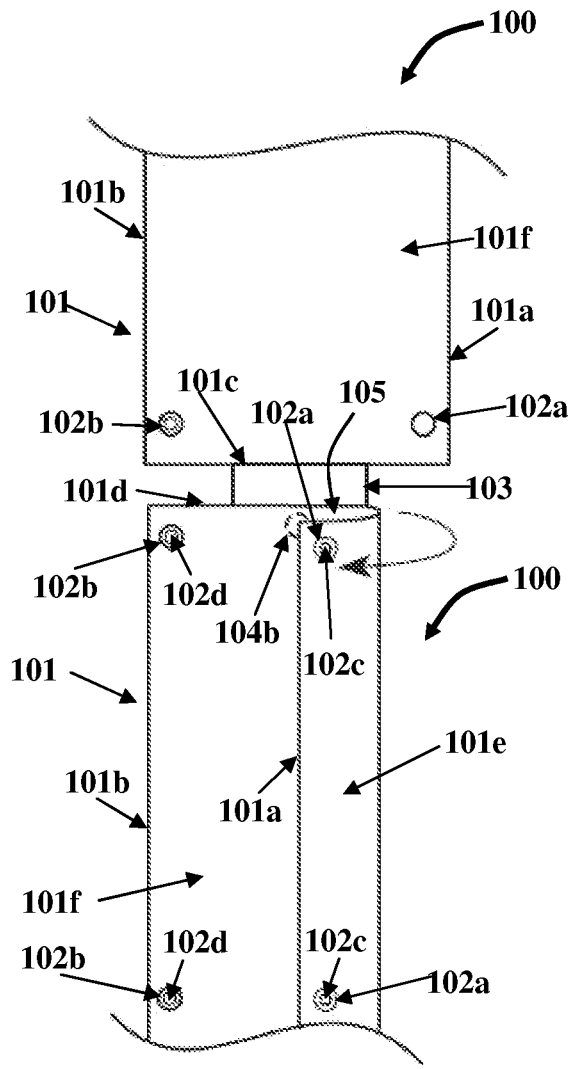
FIGS. 1B-1C exemplarily illustrate front orthogonal views of the protective sheathing apparatus detachably engaged with another protective sheathing apparatus, showing creation of a generally cylindrical lengthwise channel within an elongated flexible member of the protective sheathing apparatus.
Figure 1C:
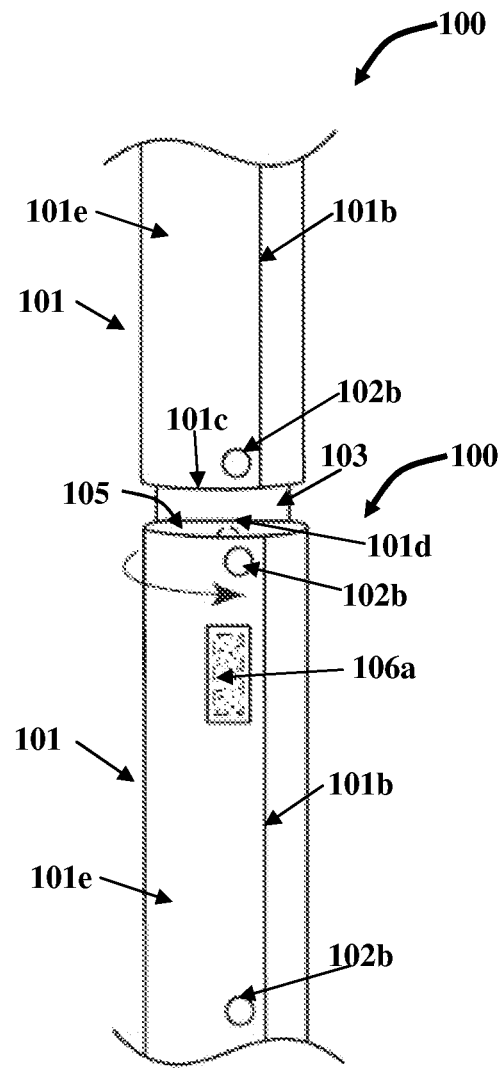

FIGS. 1B-1C exemplarily illustrate front orthogonal views of the protective sheathing apparatus 100 detachably engaged with another protective sheathing apparatus 100, showing creation of a generally cylindrical lengthwise channel 105 within the elongated flexible member 101 of the protective sheathing apparatus 100. To create the generally cylindrical lengthwise channel 105, the second fastening elements 102b affixed in proximity to the second lengthwise edge 101b on the interior surface 101f of the elongated flexible member 101 detachably engage with the first fastening elements 102a affixed in proximity to the first lengthwise edge 101a on the exterior surface 101e of the elongated flexible member 101, when the second lengthwise edge 101b of the elongated flexible member 101 is rolled over towards the first lengthwise edge 101a of the elongated flexible member 101 as exemplarily illustrated in FIGS. 1B-1C. The first fastening elements 102a and the second fastening elements 102b are a pair of interlocking discs. For example, each of the first fastening elements 102a comprises a stud 102c, while each of the second fastening elements 102b comprises a socket 102d. The stud 102c of each of the first fastening elements 102a fits into the socket 102d of each of the corresponding second fastening elements 102b to create a rigid joint, when a force is applied.

When the second lengthwise edge 101b of the elongated flexible member 101 is rolled over towards the first lengthwise edge 101a of the elongated flexible member 101 and fastened using the second fastening elements 102b and the first fastening elements 102a, the generally rectangular elongated flexible member 101 takes a form of a generally cylindrical elongated flexible member 101 as exemplarily illustrated in FIG. 1C. The detachable engagement of the second fastening elements 102b with the first fastening elements 102a defines the generally cylindrical lengthwise channel 105 within the elongated flexible member 101 for accommodating one or more longitudinal objects 201 as exemplarily illustrated in FIGS. 2A-2B and FIGS. 6A-6C. As exemplarily illustrated in FIG. 1B, the attachment section 103 rigidly attached to and extending outwardly from the first widthwise edge 101c of the elongated flexible member 101 of one protective sheathing apparatus 100 is detachably engaged with the second widthwise edge 101d of the elongated flexible member 101 of the other protective sheathing apparatus 100 using the fastening elements 104a and 104b.

Figure 3A:
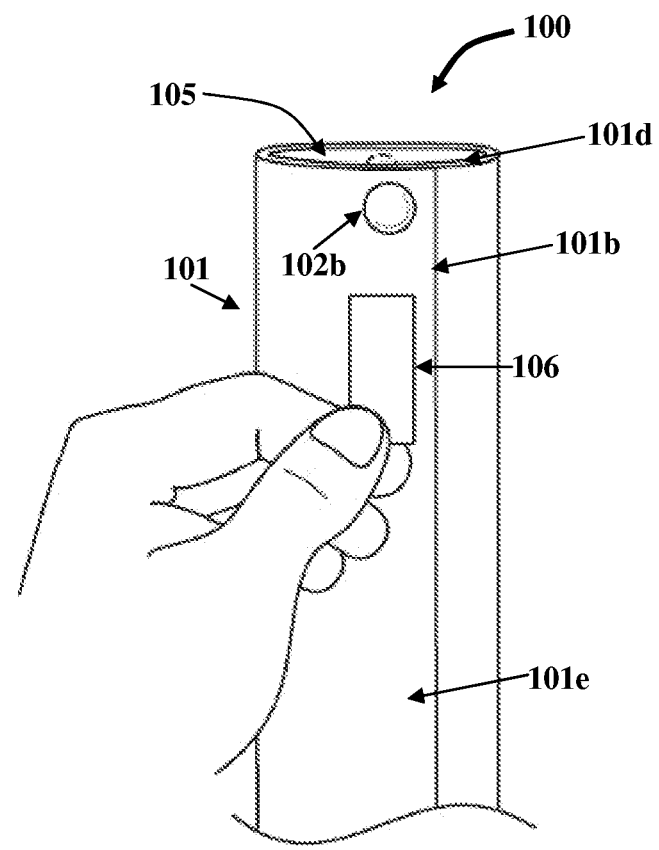
FIGS. 3A-3C exemplarily illustrate a third fastening element affixed on an exterior surface of the elongated flexible member of the protective sheathing apparatus for enabling detachable attachment of the protective sheathing apparatus that encloses the longitudinal objects to a support surface.
Figure 3B:
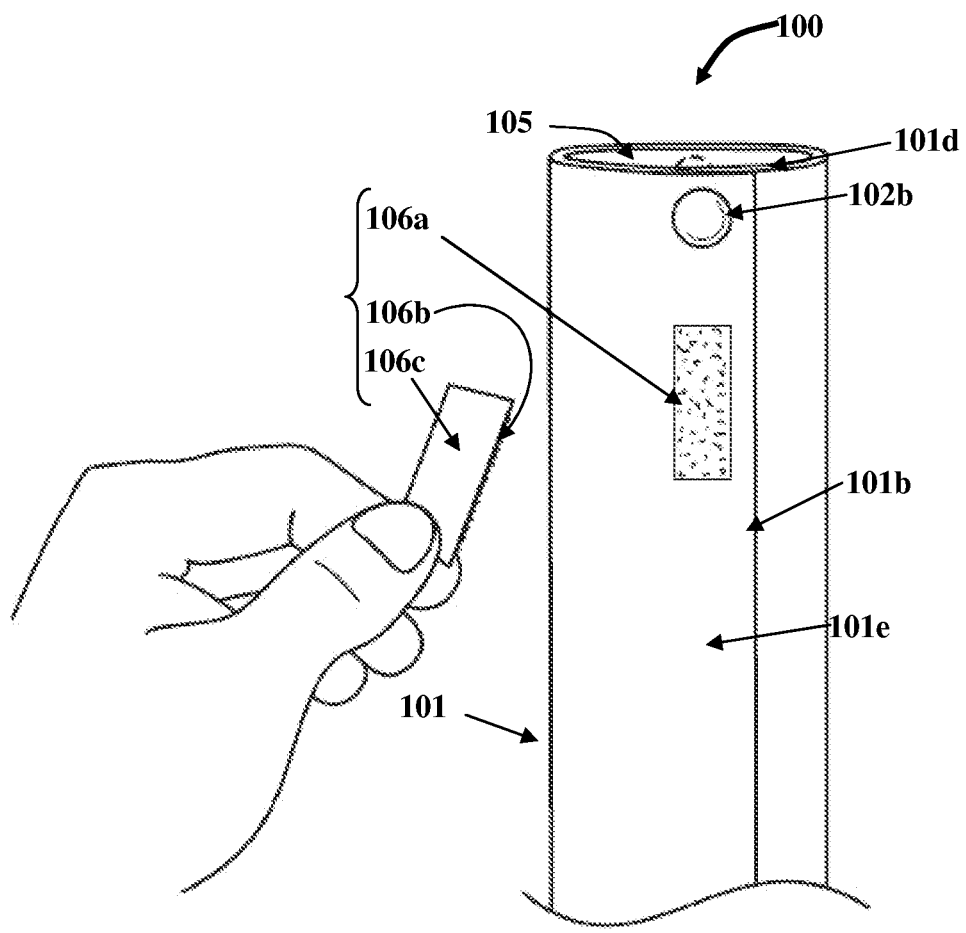
Figure 3C:
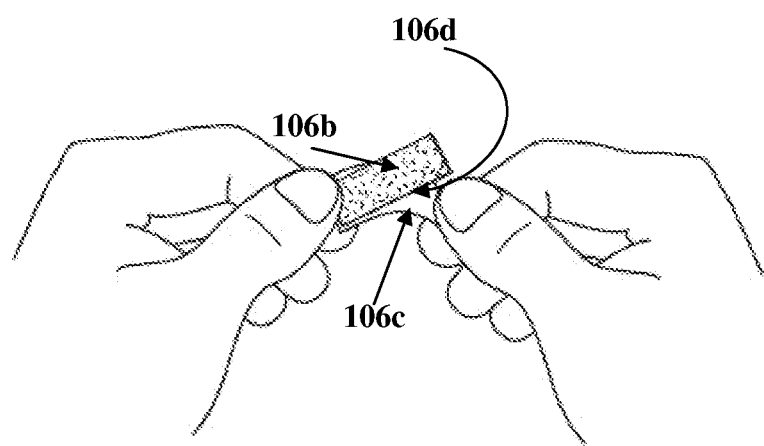
Figure 4:
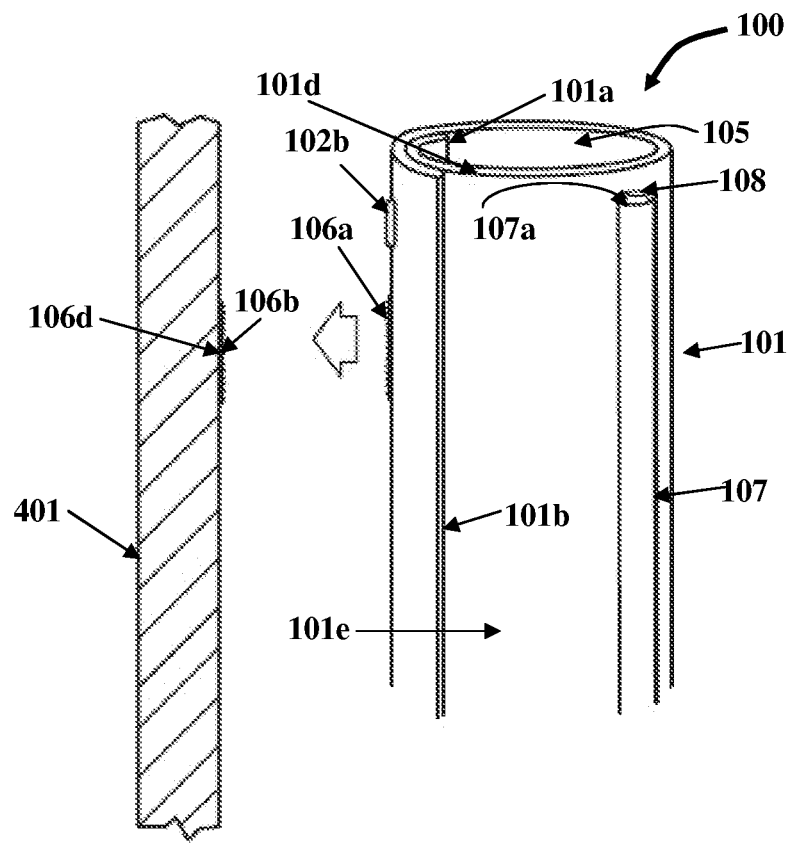
FIG. 4 exemplarily illustrates a front orthogonal view showing the detachable attachment of the protective sheathing apparatus to a support surface using a third fastening element.

The protective sheathing apparatus 100 further comprises one or more third fastening elements 106 affixed on an exterior surface 101e of the elongated flexible member 101, as exemplarily illustrated in FIGS. 3A-3C, for enabling detachable attachment of the protective sheathing apparatus 100 enclosing one or more longitudinal objects 201 to a support surface 401, for example, a wall, as exemplarily illustrated in FIG. 4. The third fastening elements 106 are, for example, hook and loop fasteners such as Velcro®, having hook sides 106a and loop sides 106b. The hook sides 106a or the loop sides 106b of the third fastening elements 106 are affixed on the exterior surface 101e of the elongated flexible member 101, while an opposing one of the hook sides 106a and the loop sides 106b of the third fastening elements 106 are attached to the support surface 401 for allowing the detachable attachment of the protective sheathing apparatus 100 to the support surface 401. For example, if the hook sides 106a of the third fastening elements 106 are affixed on the exterior surface 101e of the elongated flexible member 101, the loop sides 106b of the third fastening elements 106 are attached to the support surface 401 and vice versa. As exemplarily illustrated in FIG. 1C, a hook side 106a of a third fastening element 106 is affixed on the exterior surface 101e of the elongated flexible member 101. The hook sides 106a or the loop sides 106b of one or more third fastening elements 106 are affixed on the exterior surface 101e of the elongated flexible member 101, for example, by sewing, using adhesives, etc.

Figure 2A:
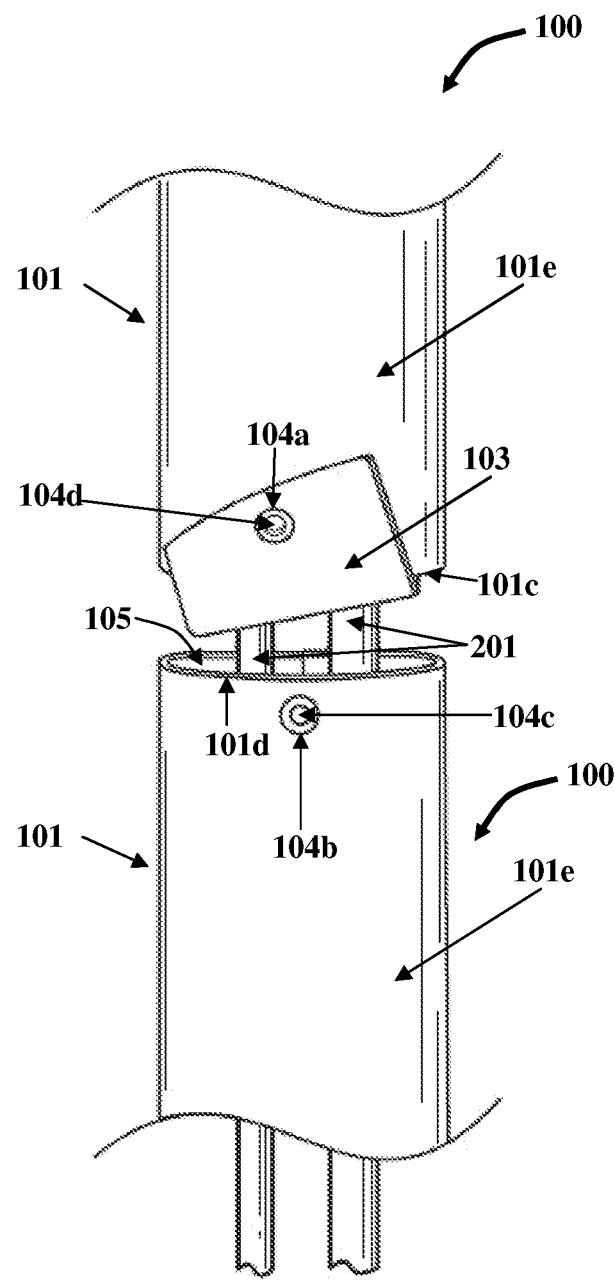
FIGS. 2A-2B exemplarily illustrate front orthogonal views of the protective sheathing apparatus detachably engaged with another protective sheathing apparatus for enclosing longitudinal objects.
Figure 2B:
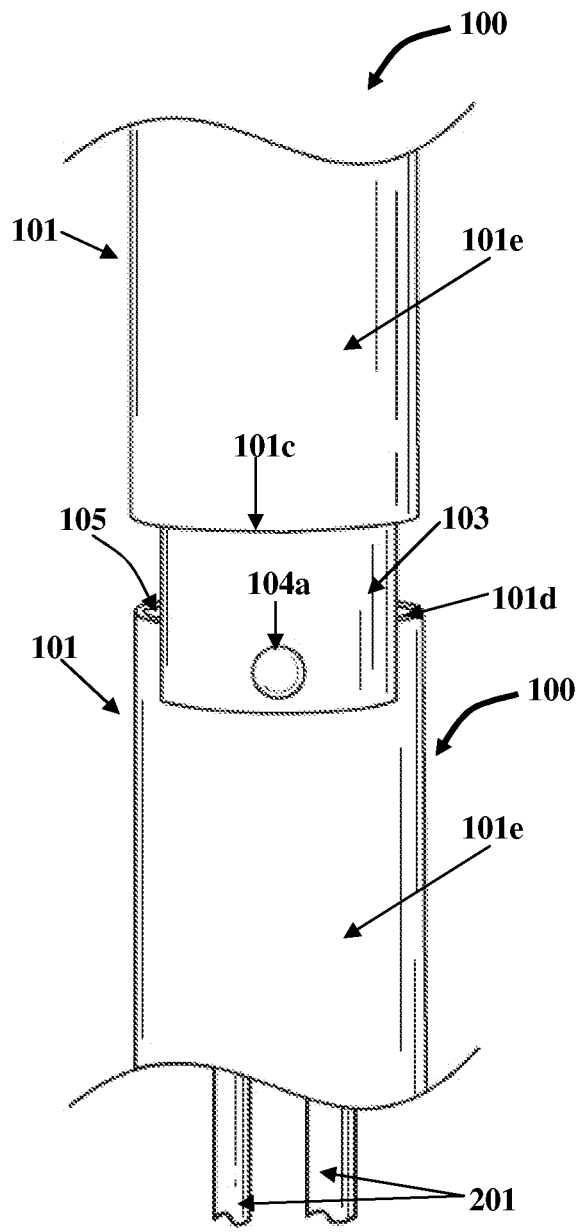

FIGS. 2A-2B exemplarily illustrate front orthogonal views of the protective sheathing apparatus 100 detachably engaged with another protective sheathing apparatus 100 for enclosing longitudinal objects 201. The elongated flexible member 101 encloses one or more longitudinal objects 201 within the generally cylindrical lengthwise channel 105 defined within the elongated flexible member 101. The longitudinal objects 201 are, for example, cables, cords, wires, etc. The attachment section 103 is rigidly attached to and extends outwardly from the first widthwise edge 101c of the elongated flexible member 101, as exemplarily illustrated in FIG. 2A, for enabling detachable engagement with another protective sheathing apparatus 100 as exemplarily illustrated in FIG. 2B.

The attachment section 103 on the first widthwise edge 101c of the elongated flexible member 101 of one protective sheathing apparatus 100 detachably engages with the second widthwise edge 101d of the elongated flexible member 101 of another protective sheathing apparatus 100, for example, using the fastening elements 104a and 104b. For example, one fastening element 104a provided with a socket 104d is affixed on the attachment section 103 of the protective sheathing apparatus 100, while another fastening element 104b with a stud 104c is affixed in proximity to the second widthwise edge 101d of the elongated flexible member 101 of another protective sheathing apparatus 100 as exemplarily illustrated in FIG. 2A. The fastening element 104b provided with the stud 104c fits into the socket 104d of the fastening element 104a to create a rigid joint, when a force is applied as exemplarily illustrated in FIG. 2B. The engaged protective sheathing apparatuses 100 accommodate longitudinal objects 201 having long lengths within the extended generally cylindrical lengthwise channel 105 defined within the elongated flexible members 101.

FIGS. 3A-3C exemplarily illustrate a third fastening element 106 affixed on an exterior surface 101e of the elongated flexible member 101 of the protective sheathing apparatus 100 for enabling detachable attachment of the protective sheathing apparatus 100 that encloses the longitudinal objects 201 to a support surface 401. The hook side 106a of the third fastening element 106 affixed on the exterior surface 101e of the elongated flexible member 101 is covered by the loop side 106b of the third fastening element 106 having a seal 106c as exemplarily illustrated in FIGS. 3A-3B. A user can remove the loop side 106b from the hook side 106a, as exemplarily illustrated in FIG. 3B, for detachable attachment of the loop side 106b to a support surface 401 as exemplarily illustrated in FIG. 4. The user can then remove the seal 106c of the loop side 106b of the third fastening element 106, as exemplarily illustrated in FIG. 3C, to expose an adhesive side 106d of the third fastening element 106. The adhesive side 106d of the third fastening element 106 is attached to the support surface 401. The protective sheathing apparatus 100 enclosing the longitudinal objects 201 can then be detachably attached to the support surface 401 by detachably engaging the hook side 106a and the loop side 106b of the third fastening element 106 as disclosed in the detailed description of FIG. 4.

FIG. 4 exemplarily illustrates a front orthogonal view showing the detachable attachment of the protective sheathing apparatus 100 to a support surface 401 using a third fastening element 106. The protective sheathing apparatus 100 is detachably attached to the support surface 401, for example, a wall using the third fastening element 106. The third fastening element 106 is, for example, a hook and loop fastener having a hook side 106a and a loop side 106b. A hook and loop fastener comprises two lineal fabric strips attached to opposing surfaces 101 and 401 to be fastened. When the hook side 106a and the loop side 106b of the third fastening element 106 are pressed together, the elongated flexible member 101 binds to the support surface 401. This enables the protective sheathing apparatus 100 to be held in a particular position, for example, a raised position, to provide easy access, for example, during cleaning of floors.

As exemplarily illustrated in FIG. 4, the hook side 106a of the third fastening element 106 is affixed on the exterior surface 101e of the elongated flexible member 101, for example, by sewing, using adhesives, etc., while the loop side 106b of the third fastening element 106 is attached to the support surface 401, for example, using adhesives, via the adhesive side 106d as disclosed in the detailed description of FIGS. 3A-3C. When the hook side 106a of the third fastening element 106 affixed on the exterior surface 101e of the elongated flexible member 101 of the protective sheathing apparatus 100 is pressed against the loop side 106b of the third fastening element 106 attached to the support surface 401, the hook side 106a of the third fastening element 106 having hooks catch in the hair like structures or loops on the loop side 106b of the third fastening element 106, thereby resulting in binding or attachment of the protective sheathing apparatus 100 to the support surface 401. Also exemplarily illustrated in FIG. 4 is a support sleeve 107 attached along the exterior surface 101e of the elongated flexible member 101 of the protective sheathing apparatus 100 as disclosed in the detailed description of FIG. 5.

Figure 5:
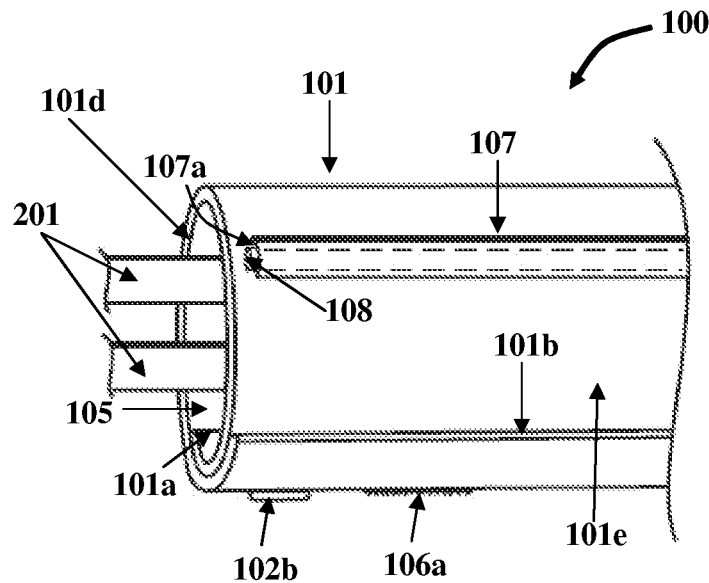
FIG. 5 exemplarily illustrates a perspective view of the protective sheathing apparatus, showing a support sleeve attached along an exterior surface of the elongated flexible member of the protective sheathing apparatus.

FIG. 5 exemplarily illustrates a perspective view of the protective sheathing apparatus 100, showing a support sleeve 107 attached along the exterior surface 101e of the elongated flexible member 101 of the protective sheathing apparatus 100. In an embodiment, the protective sheathing apparatus 100 disclosed herein further comprises the support sleeve 107 attached along the exterior surface 101e of the elongated flexible member 101. The support sleeve 107 defines a pocket 107a along the elongated flexible member 101 for incorporating a shaping rod 108 within the defined pocket 107a. The shaping rod 108 is, for example, an extruded shaping rod made of plastic that provides strength and stability to the protective sheathing apparatus 100, when the protective sheathing apparatus 100 encloses longitudinal objects 201 within the generally cylindrical lengthwise channel 105 defined within the elongated flexible member 101. In an embodiment, the shaping rod 108 is manufactured, for example, using a plastic extrusion process, in which a plastic material is melted and formed into a continuous profile.

Figure 6A:
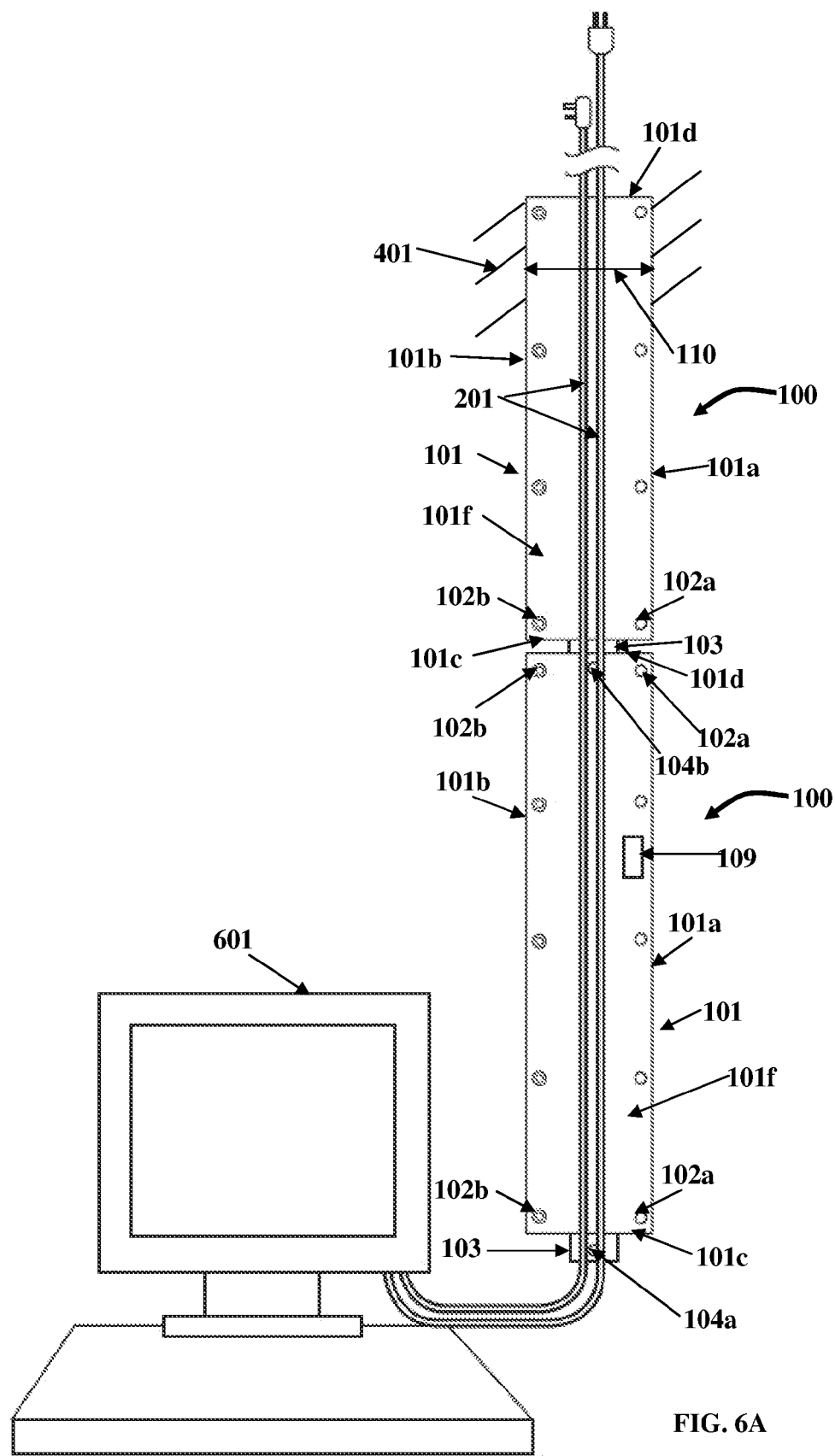
FIGS. 6A-6C exemplarily illustrate the use of the protective sheathing apparatus for enclosing and organizing one or more longitudinal objects of an electronic device.
Figure 6B:
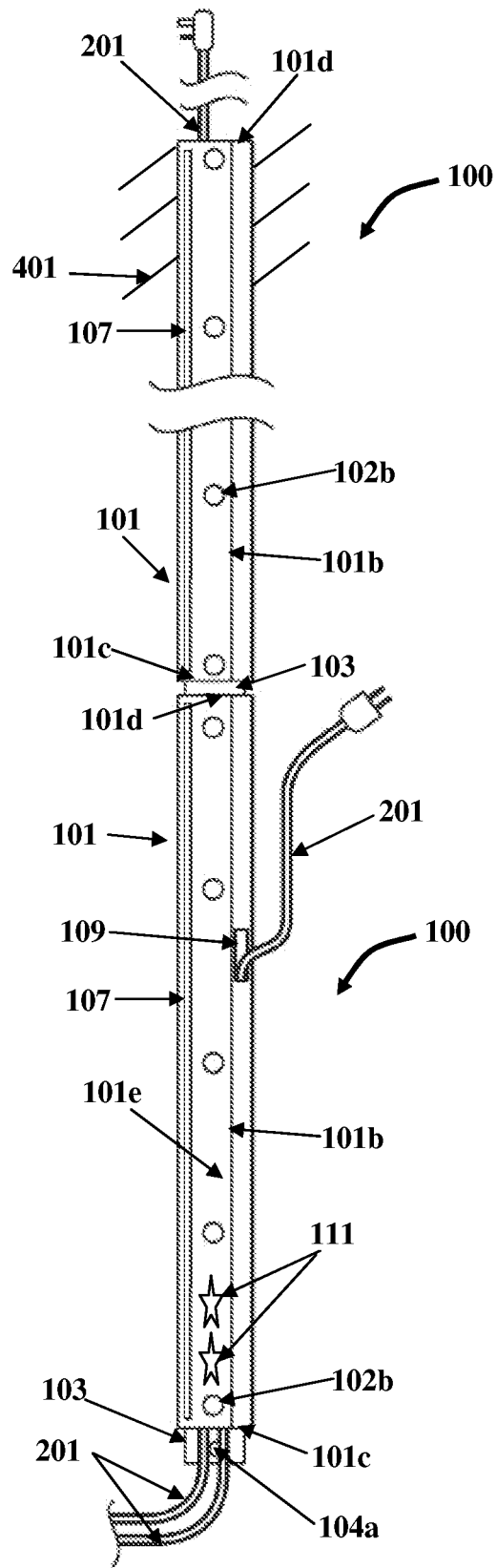
Figure 6C:
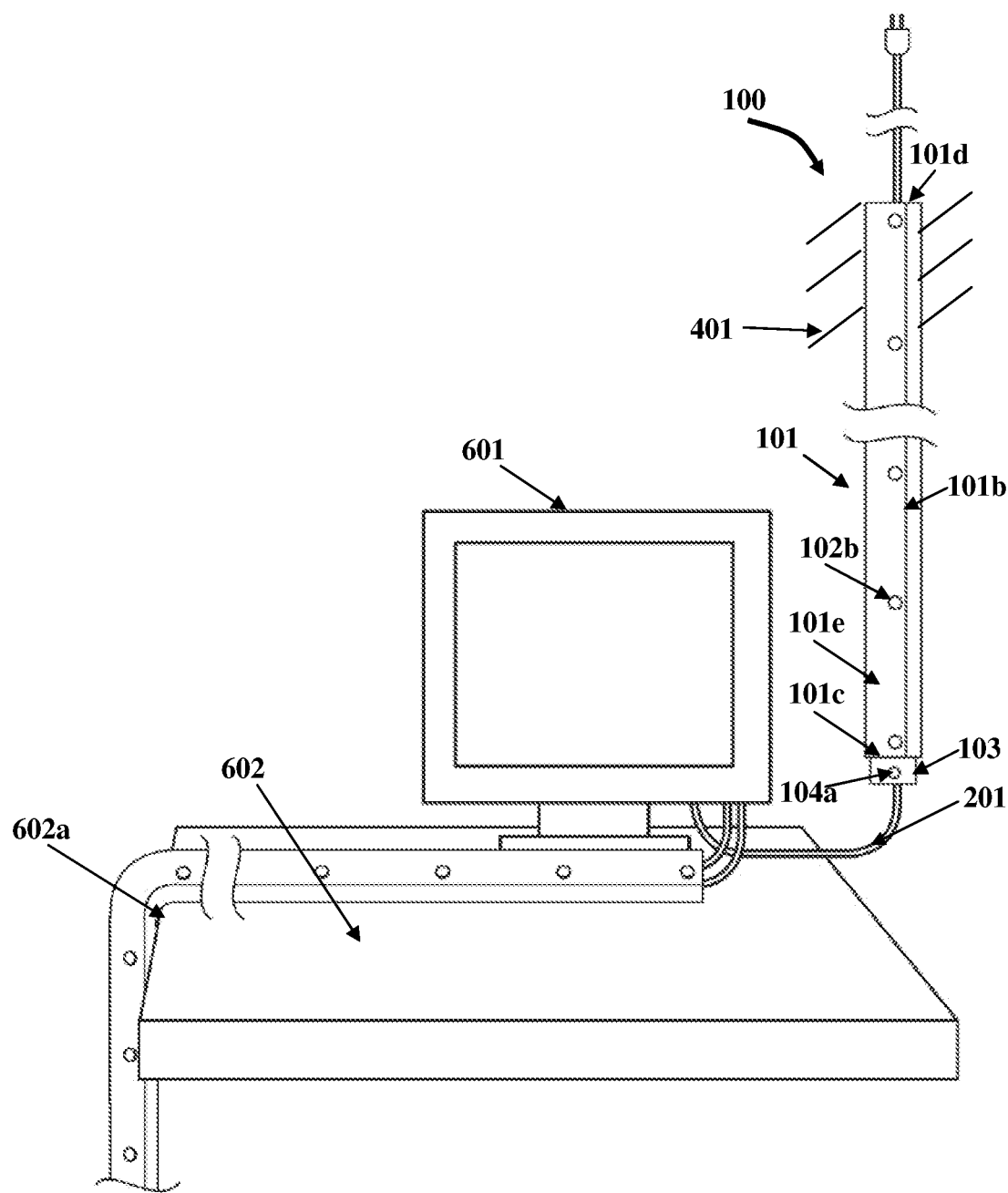

The shaping rod 108 enables the protective sheathing apparatus 100 to be smoothly maneuvered along contours 602a of one or more support surfaces 602 of, for example, a table as exemplarily illustrated in FIG. 6C or along other irregular surfaces. The shaping rod 108 allows bending of the protective sheathing apparatus 100 into a shapeable turn around the contours 602a of one or more support surfaces 602. The shaping rod 108 provides for controlled positioning and organization of the enclosed longitudinal objects 201 on support surfaces 401, 602, for example, a wall, a table surface, a floor, etc., and for increasing the strength and flexibility of the protective sheathing apparatus 100. The shaping rod 108 sustains a particular shape or a particular configuration of the protective sheathing apparatus 100 for a substantially long period of time.

FIGS. 6A-6C exemplarily illustrate the use of the protective sheathing apparatus 100 for enclosing and organizing longitudinal objects 201 of an electronic device 601. The protective sheathing apparatus 100 disclosed herein is used for enclosing and organizing one or more longitudinal objects 201, for example, computer cables, of an electronic device 601 such as a computer. During usage, the protective sheathing apparatus 100 is first kept open, that is, the first fastening elements 102a are not engaged with the second fastening elements 102b and hence the first lengthwise edge 101a and the second lengthwise edge 101b of the elongated flexible member 101 are separated by a distance 110 as exemplarily illustrated in FIG. 6A. The longitudinal objects 201, for example, a bunch of computer cables, are positioned lengthwise within the elongated flexible member 101 between the first lengthwise edge 101a and the second lengthwise edge 101b.

The first fastening elements 102a affixed in proximity to the first lengthwise edge 101a of the elongated flexible member 101 are then engaged with the second fastening elements 102b affixed in proximity to the second lengthwise edge 101b of the elongated flexible member 101, thereby defining the generally cylindrical lengthwise channel 105 within the elongated flexible member 101 as exemplarily illustrated in FIGS. 1B-1C. The elongated flexible member 101 encloses the longitudinal objects 201 as exemplarily illustrated in FIGS. 6B-6C. If more than one protective sheathing apparatus 100 is needed, the attachment section 103 of one protective sheathing apparatus 100 is detachably engaged to another protective sheathing apparatus 100 using the interlocking fastening elements 104a and 104b. When the longitudinal objects 201, for example, the computer cables, are enclosed or wrapped in the protective sheathing apparatuses 100, the protective sheathing apparatuses 100 can then be attached to the support surface 401, 602, etc., of a wall or a desk to hold the protective sheathing apparatuses 100 in place as exemplarily illustrated in FIG. 6A and FIG. 6C.

In an embodiment, one or more patterns 111 and textual information are displayed on the exterior surface 101e of the elongated flexible member 101 as exemplarily illustrated in FIG. 6B for decorative and/or instructional purposes. In an embodiment, the protective sheathing apparatus 100 disclosed herein further comprises one or more slots 109 defined on the elongated flexible member 101 for allowing one or more of the longitudinal objects 201 to be inserted into and exited out from the generally cylindrical lengthwise channel 105 defined within the elongated flexible member 101 as exemplarily illustrated in FIG. 6B.

The exterior surface 101e of the elongated flexible member 101 of each of the protective sheathing apparatuses 100 can be attached to the support surface 401, for example, using a third fastening element 106 as disclosed in the detailed description of FIG. 4. The protective sheathing apparatus 100 may be vertically attached to a support surface 401, for example, a wall, as exemplarily illustrated in FIGS. 6B-6C. The protective sheathing apparatus 100 may also be horizontally attached to a support surface 602, for example, a table surface, as exemplarily illustrated in FIG. 6C. The protective sheathing apparatus 100 takes an arbitrary shape as desired by a user and remains attached on the support surface 401, 602, etc., until the protective sheathing apparatus 100 is required for a purpose such as for inserting additional longitudinal objects 201 into the generally cylindrical lengthwise channel 105 defined within the elongated flexible member 101 of the protective sheathing apparatus 100, for cleaning, for reattaching the protective sheathing apparatus 100 to a different location on the support surface 401, 602, etc., or for reshaping the protective sheathing apparatus 100 into a different desired arbitrary shape, etc. Enclosing and organization of the longitudinal objects 201 using the protective sheathing apparatus 100 disclosed herein results in efficient use of space and avoids entangling of the enclosed longitudinal objects 201. This results in efficient use of the enclosed longitudinal objects 201 and prevents users from experiencing electric shock, tripping, inconvenience during cleaning or maintenance, etc.

Figure 7:
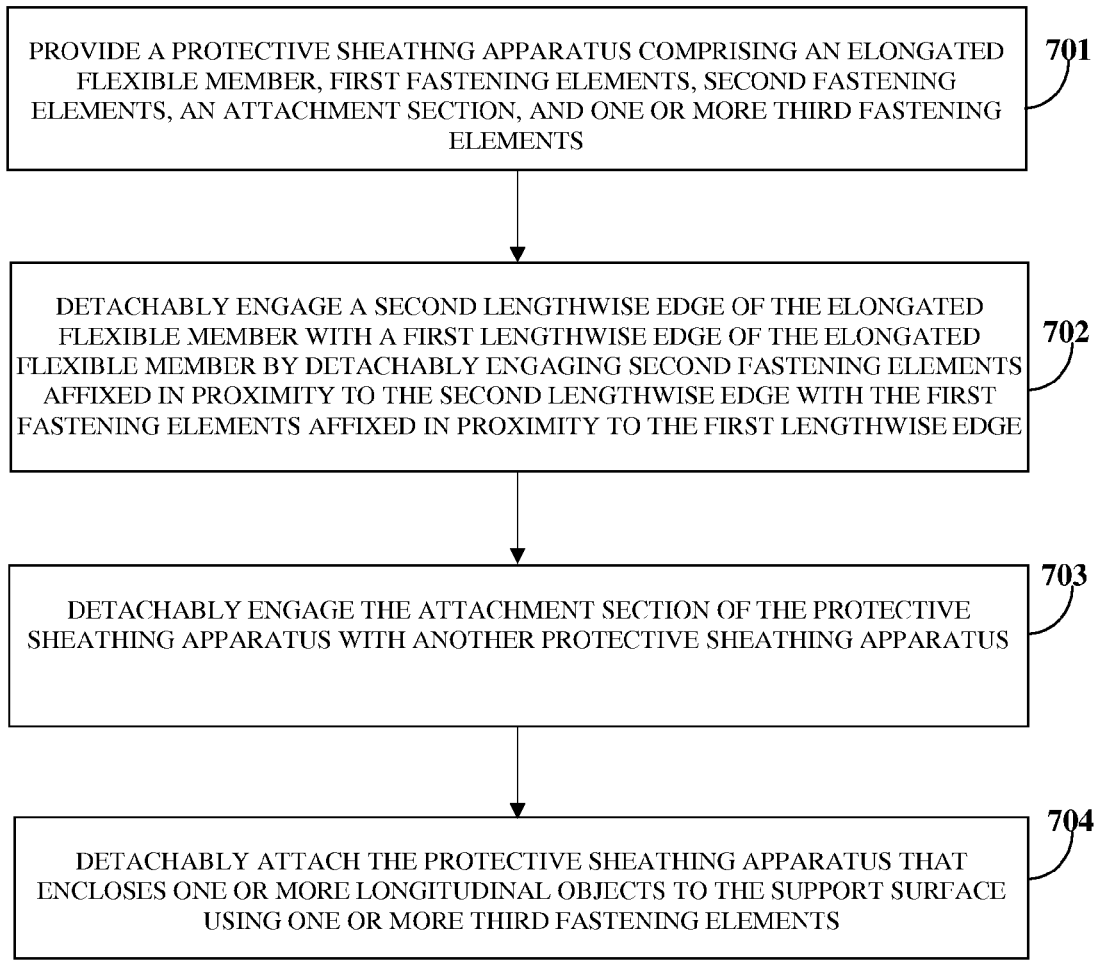
FIG. 7 illustrates a method for enclosing and organizing one or more longitudinal objects on a support surface.

FIG. 7 illustrates a method for enclosing and organizing one or more longitudinal objects 201 on a support surface 401, 602, etc. The protective sheathing apparatus 100 comprising the elongated flexible member 101 having a first lengthwise edge 101a, a second lengthwise edge 101b, a first widthwise edge 101c, and a second widthwise edge 101d, the first fastening elements 102a, the second fastening elements 102b, the attachment section 103, and one or more third fastening elements 106 as disclosed in the detailed description of FIGS. 1A-1C, FIGS. 3A-3C, and FIG. 5 is provided 701. The second lengthwise edge 101b of the elongated flexible member 101 is detachably engaged 702 with the first lengthwise edge 101a of the elongated flexible member 101 by detachably engaging the second fastening elements 102b affixed in proximity to the second lengthwise edge 101b with the first fastening elements 102a affixed in proximity to the first lengthwise edge 101a as exemplarily illustrated in FIGS. 1B-1C. The detachable engagement of the second fastening elements 102b with the first fastening elements 102a defines a generally cylindrical lengthwise channel 105 within the elongated flexible member 101 for accommodating one or more longitudinal objects 201. The elongated flexible member 101 encloses the longitudinal objects 201.

The attachment section 103 attached to and extending outwardly from the first widthwise edge 101c and/or the second widthwise edge 101d of the elongated flexible member 101 is detachably engaged 703 with another protective sheathing apparatus 100 using the interlocking fastening elements 104a and 104b as exemplarily illustrated in FIGS. 2A-2B. The protective sheathing apparatus 100 that encloses the longitudinal objects 201 is then detachably attached 704 to a support surface 401, 602, etc., using one or more third fastening elements 106 as exemplarily illustrated in FIG. 4 and FIGS. 6B-6C. In an embodiment, a shaping rod 108, as exemplarily illustrated in FIGS. 4-5, is incorporated in the pocket 107a defined by the support sleeve 107 attached along the exterior surface 101e of the elongated flexible member 101 for maneuvering the protective sheathing apparatus 100 along the contours 602a of a support surface 602, for example, a table surface as exemplarily illustrated in FIG. 6C. Furthermore, one or more of the longitudinal objects 201 may be inserted into or exited out from the generally cylindrical lengthwise channel 105 defined within the elongated flexible member 101 via one or more of the slots 109 as exemplarily illustrated in FIG. 6B.

By using the fastening elements 102a, 102b, 104a, and 104b, for example, mating snap fasteners, the longitudinal objects 201 can be inserted into the protective sheathing apparatus 100 such that the ends of the longitudinal objects 201 can exit at different points along the connected protective sheathing apparatuses 100. The protective sheathing apparatus 100 enclosing the longitudinal objects 201 can be raised off the floor and attached to any support surface 401, 602, etc., to allow, for example, easy access to carpets for vacuuming, access to hardwood floors for dusting, etc. The protective sheathing apparatus 100 may be made of fabrics of different lengths, designs, colors, and patterns.

For purposes of illustration, the detailed description refers to the first fastening elements 102a, the second fastening elements 102b, and the interlocking fastening elements 104a and 104b being snap fasteners; however, the scope of the protective sheathing apparatus 100 disclosed herein is not limited to snap fasteners but may be extended to include any fasteners of an interlocking type, for example, button snaps, hook and loop fasteners such as Velcro®, eyelets, buttons and button holes, hook and eye fasteners, etc. Similarly, the third fastening elements 106 are not limited to hook and loop fasteners such as Velcro® but may be extended to include any fasteners of an interlocking type, for example, snap fasteners, button snaps, eyelets, buttons and button holes, hook and eye fasteners, etc. In an embodiment, the third fastening elements 106 are of a non-interlocking type, for example, foam adhesive tapes.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A protective sheathing apparatus comprising:
an elongated flexible member comprising a first lengthwise edge, a second lengthwise edge, a first widthwise edge, and a second widthwise edge;
a plurality of first fastening elements affixed in proximity to said first lengthwise edge of said elongated flexible member;
a plurality of second fastening elements affixed in proximity to said second lengthwise edge of said elongated flexible member, wherein said second fastening elements are configured to detachably engage with said first fastening elements when said second lengthwise edge of said elongated flexible member is rolled over towards said first lengthwise edge of said elongated flexible member, wherein said detachable engagement of said second fastening elements with said first fastening elements defines a generally cylindrical lengthwise channel within said elongated flexible member for accommodating one or more longitudinal objects, and wherein said one or more longitudinal objects within said generally cylindrical lengthwise channel are enclosed by said elongated flexible member;
an attachment section attached to and extending outwardly from one or more of said first widthwise edge and said second widthwise edge of said elongated flexible member for enabling detachable engagement with another said protective sheathing apparatus;
one or more third fastening elements affixed on an exterior surface of said elongated flexible member for enabling detachable attachment of said protective sheathing apparatus enclosing said one or more longitudinal objects to a support surface; and
a support sleeve attached along said exterior surface of said elongated flexible member, wherein said support sleeve defines a pocket along said elongated flexible member for accommodating a shaping rod within said defined pocket, wherein said shaping rod enables said protective sheathing apparatus to be maneuvered along contours of one or more support surfaces.

2. The protective sheathing apparatus of claim 1, wherein said first fastening elements and said second fastening elements are mating snap fasteners.

3. The protective sheathing apparatus of claim 1, wherein said one or more third fastening elements are hook and loop fasteners, wherein one of hook sides and loop sides of said hook and loop fasteners are affixed on said exterior surface of said elongated flexible member.

4. The protective sheathing apparatus of claim 3, wherein an opposing one of said hook sides and said loop sides of said hook and loop fasteners are attached to said support surface for allowing said detachable attachment of said protective sheathing apparatus to said support surface.

5. The protective sheathing apparatus of claim 1, further comprising one or more slots defined on said elongated flexible member for allowing one or more of said one or more longitudinal objects to be inserted into and exited out from said generally cylindrical lengthwise channel defined within said elongated flexible member.

6. The protective sheathing apparatus of claim 1, further comprising one or more fourth fastening elements affixed on said attachment section and in proximity to one or more of said first widthwise edge and said second widthwise edge of said elongated flexible member of said another said protective sheathing apparatus for detachably engaging said protective sheathing apparatus to said another said protective sheathing apparatus.

7. The protective sheathing apparatus of claim 1, further comprising one or more patterns and textual information displayed on said exterior surface of said elongated flexible member.

8. A method for enclosing and organizing one or more of a plurality of longitudinal objects on a support surface, comprising:
providing a protective sheathing apparatus comprising:
an elongated flexible member comprising a first lengthwise edge, a second lengthwise edge, a first widthwise edge, and a second widthwise edge;
a plurality of first fastening elements affixed in proximity to said first lengthwise edge of said elongated flexible member;
a plurality of second fastening elements affixed in proximity to said second lengthwise edge of said elongated flexible member, wherein said second fastening elements are configured to detachably engage with said first fastening elements;
an attachment section attached to and extending outwardly from one or more of said first widthwise edge and said second widthwise edge of said elongated flexible member;
one or more third fastening elements affixed on an exterior surface of said elongated flexible member; and
providing a support sleeve attached along said exterior surface of said elongated flexible member, wherein said support sleeve defines a pocket along said elongated flexible member for accommodating a shaping rod within said defined pocket;
detachably engaging said second lengthwise edge of said elongated flexible member with said first lengthwise edge of said elongated flexible member by detachably engaging said second fastening elements affixed in proximity to said second lengthwise edge with said first fastening elements affixed in proximity to said first lengthwise edge, wherein said detachable engagement of said second fastening elements with said first fastening elements defines a generally cylindrical lengthwise channel within said elongated flexible member for accommodating said one or more longitudinal objects, and wherein said one or more longitudinal objects within said generally cylindrical lengthwise channel are enclosed by said elongated flexible member;
detachably engaging said attachment section of said protective sheathing apparatus with another said protective sheathing apparatus;
detachably attaching said protective sheathing apparatus that encloses said one or more longitudinal objects to said support surface using said one or more third fastening elements;
maneuvering said protective sheathing apparatus along contours of one or more support surfaces using said shaping rod.

9. The method of claim 8, wherein said protective sheathing apparatus further comprises one or more slots defined on said elongated flexible member for allowing one or more of said longitudinal objects to be inserted into and exited out from said generally cylindrical lengthwise channel defined within said elongated flexible member.

10. The method of claim 8, wherein said protective sheathing apparatus further comprises one or more fourth fastening elements affixed on said attachment section and in proximity to one or more of said first widthwise edge and said second widthwise edge of said elongated flexible member of said another said protective sheathing apparatus for detachably engaging said attachment section of said protective sheathing apparatus to said another said protective sheathing apparatus.

11. The method of claim 8, wherein said first fastening elements and said second fastening elements of said protective sheathing apparatus are mating snap fasteners.

12. The method of claim 8, wherein said one or more third fastening elements of said protective sheathing apparatus are hook and loop fasteners, wherein one of hook sides and loop sides of said hook and loop fasteners are affixed on said exterior surface of said elongated flexible member of said protective sheathing apparatus.

13. The method of claim 12, wherein an opposing one of said hook sides and said loop sides of said hook and loop fasteners are attached to said support surface for allowing said detachable attachment of said protective sheathing apparatus to said support surface.

\* \* \* \* \*